US 6,733,418 B2

(12) United States Patent
Tachibana et al.

(10) Patent No.: US 6,733,418 B2
(45) Date of Patent: May 11, 2004

(54) CONTROL SYSTEM AND METHOD FOR VEHICLE AND ENGINE CONTROL UNIT

(75) Inventors: Yosuke Tachibana, Saitama-ken (JP); Norio Suzuki, Saitama-ken (JP); Manabu Niki, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/295,314

(22) Filed: Nov. 14, 2002

(65) Prior Publication Data

US 2003/0093191 A1 May 15, 2003

(30) Foreign Application Priority Data

Nov. 14, 2001 (JP) ........................................ 2001-349341

(51) Int. Cl.[7] ............................................... F16H 61/12
(52) U.S. Cl. ........................ 477/125; 477/121; 477/906
(58) Field of Search ................. 477/906, 115, 477/121, 125; 701/62; 123/396, 397, 399

(56) References Cited

U.S. PATENT DOCUMENTS

| 4,393,732 A | * | 7/1983 | Suzuki et al. ............... 477/125 |
| 5,029,493 A | * | 7/1991 | Takada et al. ............... 477/156 |
| 5,235,951 A | * | 8/1993 | Taguchi et al. ............. 123/397 |
| 5,366,424 A | * | 11/1994 | Wataya ........................ 477/107 |
| 5,429,090 A | * | 7/1995 | Kotchi et al. ................ 123/396 |
| 5,976,056 A | * | 11/1999 | Matsumoto et al. ......... 477/125 |
| 6,371,888 B1 | * | 4/2002 | Watanabe .................... 477/174 |

* cited by examiner

Primary Examiner—Ankur Parekh
(74) Attorney, Agent, or Firm—Lahive & Cockfield, LLP; Anthony A. Laurentano

(57) ABSTRACT

There is provided a control system for a vehicle, which enables the vehicle to smoothly travel only to find a place to park when an electric throttle control device is in a condition incapable of controlling a throttle valve, thereby improving drivability. An ECU determines whether or not the electric throttle control device is in the condition incapable of controlling the throttle valve, and interrupts energization of the electric throttle control device when it is determined that the electric throttle control device is in the condition incapable of controlling the throttle valve. The throttle valve is held at a default opening position by a spring when the electric throttle control device is determined to be in the condition incapable of controlling the throttle valve. A throttle valve opening sensor detects a degree of opening of the throttle valve. The speed position of an automatic transmission is controlled to a highest speed position if the detected degree of opening of the throttle valve is equal to or smaller than a predetermined reference value when the electric throttle control device is determined to be in the condition incapable of controlling the throttle valve.

8 Claims, 3 Drawing Sheets

CONTROL SYSTEM AND METHOD FOR VEHICLE AND ENGINE CONTROL UNIT

BACKGROUND OF THE INVENTION

1. Field of the Invention

This invention relates to a control system for a vehicle including an electric throttle control device for electrically controlling a throttle valve, and an automatic transmission, and more particularly to a control system for controlling the vehicle when the electric throttle control device is in a condition incapable of controlling the throttle valve.

2. Description of the Prior Art

Conventionally, a vehicle control system of the above kind has been disclosed e.g. in the Publication of Japanese Patent No. 2891019. According to the vehicle control system, when a throttle valve has become uncontrollable e.g. due to an electrical or mechanical failure of an electric throttle control device, the electric throttle control device is deenergized, and at the same time the throttle valve is held at a default opening position so as to avoid an engine stall and allow the vehicle to travel only to find a nearby place to park.

Further, in the vehicle control system, when the throttle valve is uncontrollable, a highest allowable speed position of an automatic transmission is determined based on an operation amount or stepping amount of an accelerator pedal, and a speed position at which a largest driving force can be obtained is selected from among the determined highest speed position and speed positions lower than this so as to ensure the largest driving force according to a driver's intention to accelerate.

As described above, in the above vehicle control system, when the throttle valve has become uncontrollable due to a failure of the electric throttle control device, a proper speed position of the automatic transmission is selected or determined based on the operation amount or stepping amount of the accelerator pedal to control the automatic transmission such that the largest driving force can be obtained. For this reason, e.g. when the accelerator pedal is stepped on by the driver for acceleration of the vehicle, the speed position is down-shifted so as to obtain the largest driving force, and hence the speed of the vehicle is reduced suddenly by engine brake, which makes it impossible for the vehicle to smoothly travel only to find a nearby place to park, causing degradation of drivability.

SUMMARY OF THE INVENTION

It is an object of the invention to provide a control system for a vehicle, which enables the vehicle to travel only to find a nearby place to park when an electric throttle control device becomes incapable of controlling a throttle valve, thereby improving drivability.

To attain the above object, according to a first aspect of the present invention, there is provided a control system for a vehicle including an electric throttle control device for electrically controlling a throttle valve that controls an amount of intake air to be supplied to an internal combustion engine, and an automatic transmission, the control system comprising:

uncontrollability-determining means for determining whether or not the electric throttle control device is in a condition incapable of controlling the throttle valve;

energization-interrupting means for interrupting energization of the electric throttle control device when it is determined by the uncontrollability-determining means that the electric throttle control device is in the condition incapable of controlling the throttle valve;

opening-holding means for holding the throttle valve at a default opening position when the electric throttle control device is determined to be in the condition incapable of controlling the throttle valve;

throttle opening-detecting means for detecting a degree of opening of the throttle valve; and automatic transmission control means for controlling a speed position of the automatic transmission to a highest speed position if the detected degree of opening of the throttle valve is equal to or smaller than a predetermined reference value when the electric throttle control device is determined to be in the condition incapable of controlling the throttle valve.

According to this control system, when it is determined that the electric throttle control device is in the condition incapable of controlling the throttle valve, first, energization of the electric throttle control device is interrupted to stop control of the throttle valve by the electric throttle control device. At the same time, the throttle valve is held at the default opening position by the opening-holding means to supply intake air in an amount enabling the vehicle to perform travel to find a nearby place to park, thereby enabling the vehicle to perform this travel. Hereinafter, this travel carried out in case of uncontrollability of the throttle valve will be referred to as "refuge running". Further, when the detected degree of opening of the throttle valve is equal to or smaller than a predetermined reference value, the speed position of the automatic transmission is forcibly controlled to the highest speed position by the automatic transmission control means. Therefore, even when the accelerator pedal of the vehicle is stepped on during actual refuge running, downshift of the speed position is prevented, and hence it is possible to positively avoid a sudden decrease in the vehicle speed by engine brake, thereby achieving smooth refuge running.

Preferably, the control system further comprises vehicle speed-detecting means for detecting a traveling speed of the vehicle, and the automatic transmission control means controls the speed position of the automatic transmission to the highest speed position if the detected vehicle speed is equal to or higher than a predetermined reference value when the electric throttle control device is determined to be in the condition incapable of controlling the throttle valve.

According to this preferred embodiment, the speed position of the automatic transmission is also controlled to the highest speed position when the detected vehicle speed is equal to or higher than the predetermined reference value. In general, when vehicle speed is high, a driver is apt to feel deceleration by engine brake. This preferred embodiment makes it possible to positively prevent the driver from having such feeling and achieve smooth refuge running.

To attain the above object, according to a second aspect of the invention, there is provided a control system for a vehicle including an electric throttle control device for electrically controlling a throttle valve that controls an amount of intake air to be supplied to an internal combustion engine, and an automatic transmission, the control system comprising:

an uncontrollability-determining module for determining whether or not the electric throttle control device is in a condition incapable of controlling the throttle valve;

an energization-interrupting module for interrupting energization of the electric throttle control device when it is determined by the uncontrollability-determining module that the electric throttle control device is in the condition incapable of controlling the throttle valve;

an opening-holding module for holding the throttle valve at a default opening position when the electric throttle control device is determined to be in the condition incapable of controlling the throttle valve;

a throttle opening-detecting module for detecting a degree of opening of the throttle valve; and an automatic transmission control module for controlling a speed position of the automatic transmission to a highest speed position if the detected degree of opening of the throttle valve is equal to or smaller than a predetermined reference value when the electric throttle control device is determined to be in the condition incapable of controlling the throttle valve.

According to the second aspect of the invention, the same advantageous effects as provided by the first aspect of the invention can be obtained.

Preferably, the control system further comprises a vehicle speed-detecting module for detecting a traveling speed of the vehicle, and the automatic transmission control module controls the speed position of the automatic transmission to the highest speed position if the detected vehicle speed is equal to or higher than a predetermined reference value when the electric throttle control device is determined to be in the condition incapable of controlling the throttle valve.

According to this preferred embodiment, the same advantageous effects as provided by the preferred embodiment of the first aspect of the invention can be obtained.

To attain the above object, according to a third aspect of the invention, there is provided a control method of controlling a vehicle including an electric throttle control device for electrically controlling a throttle valve that controls an amount of intake air to be supplied to an internal combustion engine, and an automatic transmission, the control method comprising the steps of:
  determining whether or not the electric throttle control device is in a condition incapable of controlling the throttle valve;
  interrupting energization of the electric throttle control device when it is determined that the electric throttle control device is in the condition incapable of controlling the throttle valve;
  holding the throttle valve at a default opening position when the electric throttle control device is determined to be in the condition incapable of controlling the throttle valve;
  detecting a degree of opening of the throttle valve; and
  controlling a speed position of the automatic transmission to a highest speed position if the detected degree of opening of the throttle valve is equal to or smaller than a predetermined reference value when the electric throttle control device is determined to be in the condition incapable of controlling the throttle valve.

According to the third aspect of the invention, the same advantageous effects as provided by the first aspect of the invention can be obtained.

Preferably, the control method further comprises the step of detecting a traveling speed of the vehicle, and the step of controlling the speed position of the automatic transmission includes controlling the speed position of the automatic transmission to the highest speed position if the detected vehicle speed is equal to or higher than a predetermined reference value when the electric throttle control device is determined to be in the condition incapable of controlling the throttle valve.

According to this preferred embodiment, the same advantageous effects as provided by the preferred embodiment of the first aspect of the invention can be obtained.

To attain the above object, according to a fourth aspect of the invention, there is provided an engine control unit including a control program for causing a computer to control a vehicle including an electric throttle control device for electrically controlling a throttle valve that controls an amount of intake air to be supplied to an internal combustion engine, and an automatic transmission, wherein the control program causes the computer to determine whether or not the electric throttle control device is in a condition incapable of controlling the throttle valve, interrupt energization of the electric throttle control device when it is determined that the electric throttle control device is in the condition incapable of controlling the throttle valve, hold the throttle valve at a default opening position when the electric throttle control device is determined to be in the condition incapable of controlling the throttle valve, detect a degree of opening of the throttle valve, and control a speed position of the automatic transmission to a highest speed position if the detected degree of opening of the throttle valve is equal to or smaller than a predetermined reference value when the electric throttle control device is determined to be in the condition incapable of controlling the throttle valve.

According to the fourth aspect of the invention, the same advantageous effects as provided by the first aspect of the invention can be obtained.

Preferably, the program causes the computer to detect a traveling speed of the vehicle, and the program causes the computer to control the speed position of the automatic transmission to the highest speed position when the electric throttle control device is determined to be in the condition incapable of controlling the throttle valve, further on condition that the detected vehicle speed is equal to or higher than a predetermined reference value.

According to this preferred embodiment, the same advantageous effects as provided by the preferred embodiment of the first aspect of the invention can be obtained.

The above and other objects, features, and advantages of the invention will become more apparent from the following detailed description taken in conjunction with the accompanying drawings.

DETAILED DESCRIPTION OF A PREFERRED EMBODIMENT

Figure 1:
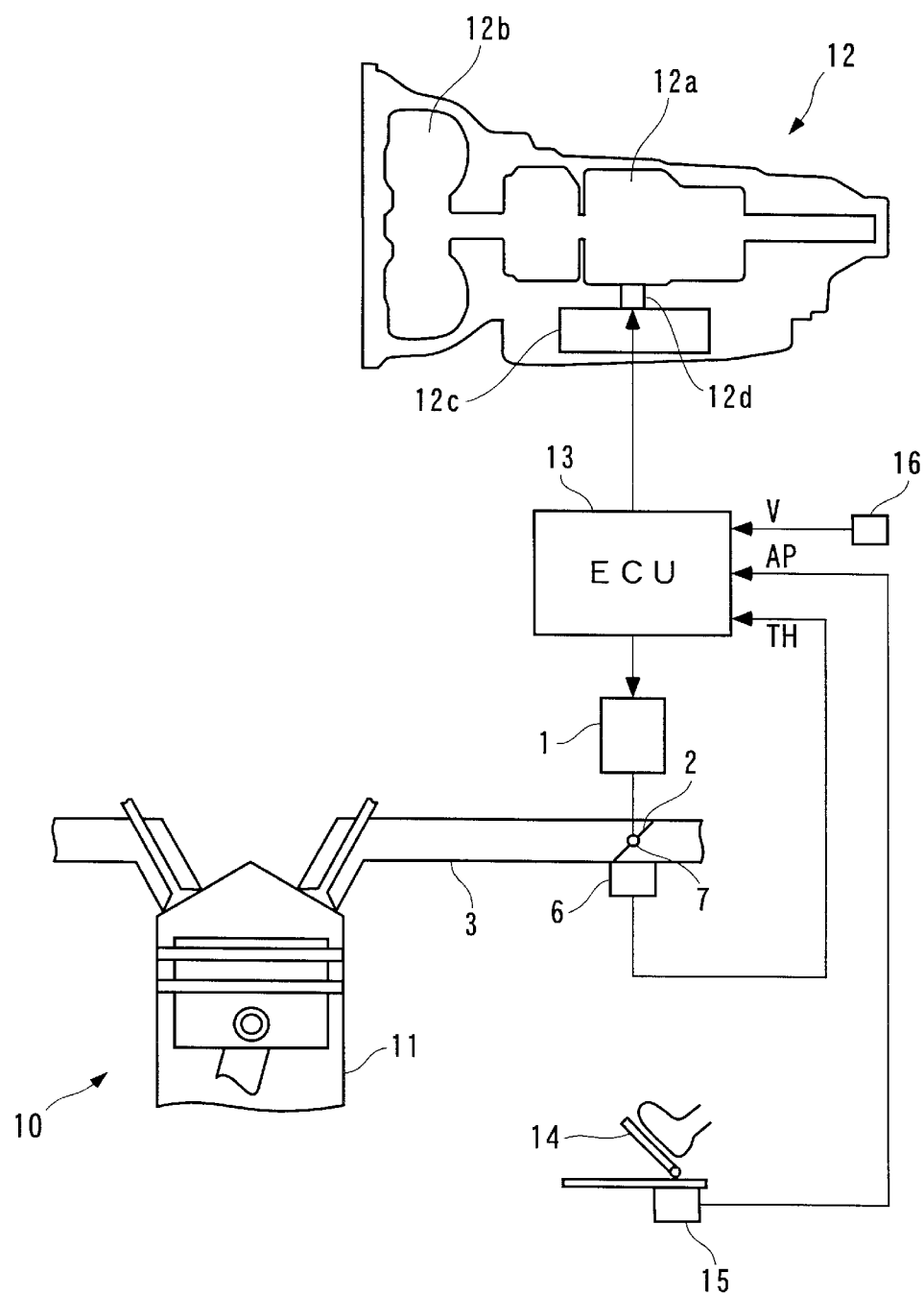
FIG. 1 is a diagram schematically showing the arrangement of a control system for a vehicle, according to an embodiment of the present invention.
Figure 2:
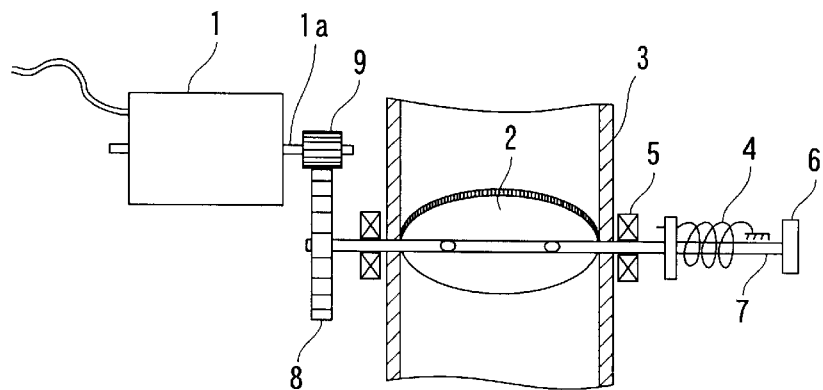
FIG. 2 is an enlarged partial cross-sectional view of an electric throttle control device.

The invention will now be described in detail with reference to the drawings showing a preferred embodiment thereof. FIG. 1 is a diagram schematically showing the arrangement of a control system for a vehicle, to which the present invention is applied, while FIG. 2 is an enlarged partial cross-sectional view of an electric throttle control device.

As shown in the figures, an internal combustion engine (hereinafter referred to as "the engine") 10 has an intake pipe 3 having a throttle valve 2 arranged therein for controlling the amount of intake air to be supplied to a cylinder 11. The throttle valve 2 is mounted in the intake pipe 3 such that it can pivotally move on a drive shaft 7 integrally formed with the throttle valve 2 and supported on bearings 5. Connected to one end of the drive shaft 7 is an output shaft 1a of a DC motor 1 via reduction gears 8 and 9. The DC motor 1 is electrically connected to an ECU 13 and has its operation controlled by the same. In short, in the present embodiment, the electric throttle control device is comprised of the DC motor 1, the reduction gears 8, 9, and the ECU 13. Further, attached to the other end of the drive shaft 7 is a throttle valve opening sensor 6 (throttle opening-detecting means) which detects a degree TH of opening of the throttle valve 2 (hereinafter referred to as "the throttle valve opening TH") to deliver a signal indicative of the sensed throttle valve opening TH to the ECU 2. A spring 4 (opening-holding means) is also attached to the other end of the drive shaft 7, for holding the throttle valve 2 at a predetermined default position. When the throttle valve 2 is held at the default position, intake air is supplied to the cylinder 11 in an amount corresponding to an engine rotational speed slightly higher than an idle engine rotational speed, which makes it possible to perform the refuge running, for instance.

An automatic transmission system 12 is connected to a crankshaft, not shown, of the engine 10. The automatic transmission system 12 includes a transmission 12a which can be shifted e.g. to any of five speed positions having respective gear ratios, a torque converter 12b which amplifies a driving force during the start or acceleration of the vehicle, and a hydraulic pressure control circuit 12c having a shift solenoid 12d, which controls the gear ratio of the transmission 12a. The shift solenoid 12d; is connected to the ECU 13 and has its operation controlled by a signal delivered from the same.

Further, a vehicle speed sensor 16 (vehicle speed-detecting means) and an accelerator pedal opening sensor 15 are connected to the ECU 13, for delivering thereto a signal indicative of a vehicle speed V sensed by the vehicle speed sensor 16 and a signal indicative of an operation amount or stepping amount (hereinafter referred to as "the accelerator pedal opening") AP sensed by the accelerator pedal sensor 15 upon operation of an accelerator pedal 14 by a driver, respectively.

In the present invention, the ECU 13 forms uncontrollability-determining means, energization-interrupting means, and automatic transmission control means. The ECU 13 is implemented by a microcomputer comprised of a CPU, a RAM, a ROM, an input/output interface, and various timers. The ECU 13 controls the throttle valve opening based on the detected accelerator pedal opening AP and other parameters. Further, the ECU 13 determines or selects a speed position based on the detected vehicle speed V and accelerator pedal opening AP and other parameters, and then supplies a drive signal generated based on the determination or selection to the shift solenoid 12d of the hydraulic pressure control circuit 12c to thereby control the speed position of the automatic transmission system 12.

Figure 3:
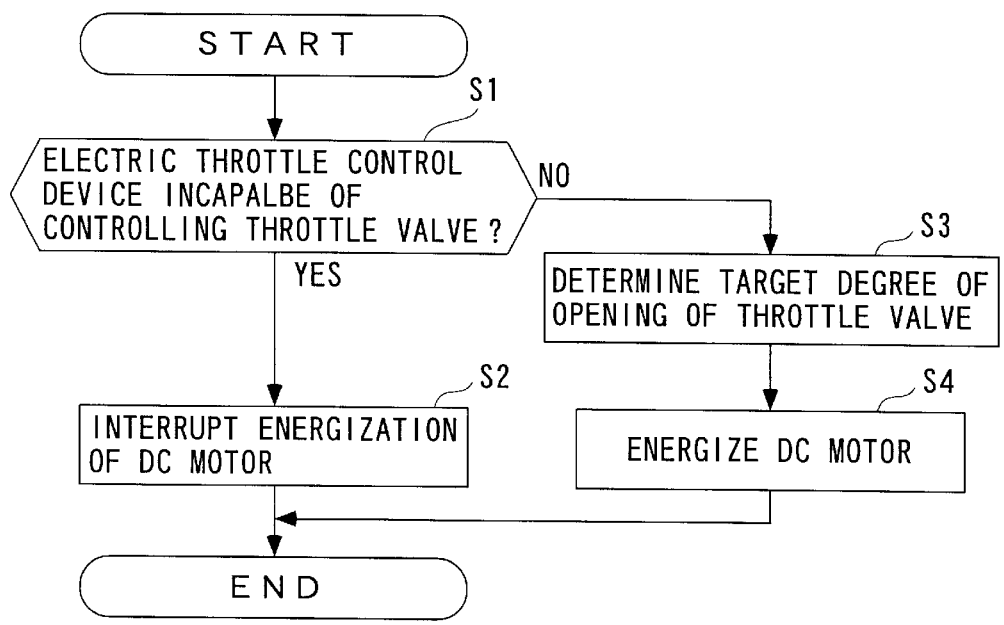
FIG. 3 is a flowchart of a control process for controlling the electric throttle control device.

FIG. 3 is a flowchart of a control process for controlling the electric throttle control device. This process is repeatedly executed by the ECU 13 at predetermined time intervals.

First, it is determined in a step S1 whether or not the electric throttle control device is in the condition incapable of controlling the throttle valve 2. In this step, e.g. when a state in which the difference between a target degree of opening of the throttle valve 2 and a detected actual throttle valve opening TH has continued to be equal to or larger than a predetermined value for a predetermined time period or longer, it is determined that the electric throttle control device is in the condition incapable of controlling the throttle valve 2. If the electric throttle control device is determined to be in the condition incapable of controlling the throttle valve 2, energization of the DC motor 1 is stopped in a step S2, followed by terminating the program. On the other hand, if the electric throttle control device is determined to be capable of controlling the throttle valve 2 in the step S1, the program proceeds to a step S3, wherein the target degree of opening of the throttle valve 2 is determined according to a detected accelerator pedal opening AP and other parameters. Then, a control signal generated based on the target degree of opening determined in the step S3 is supplied to the DC motor 1 (i.e. the DC motor is energized), followed by terminating the program.

Figure 4:
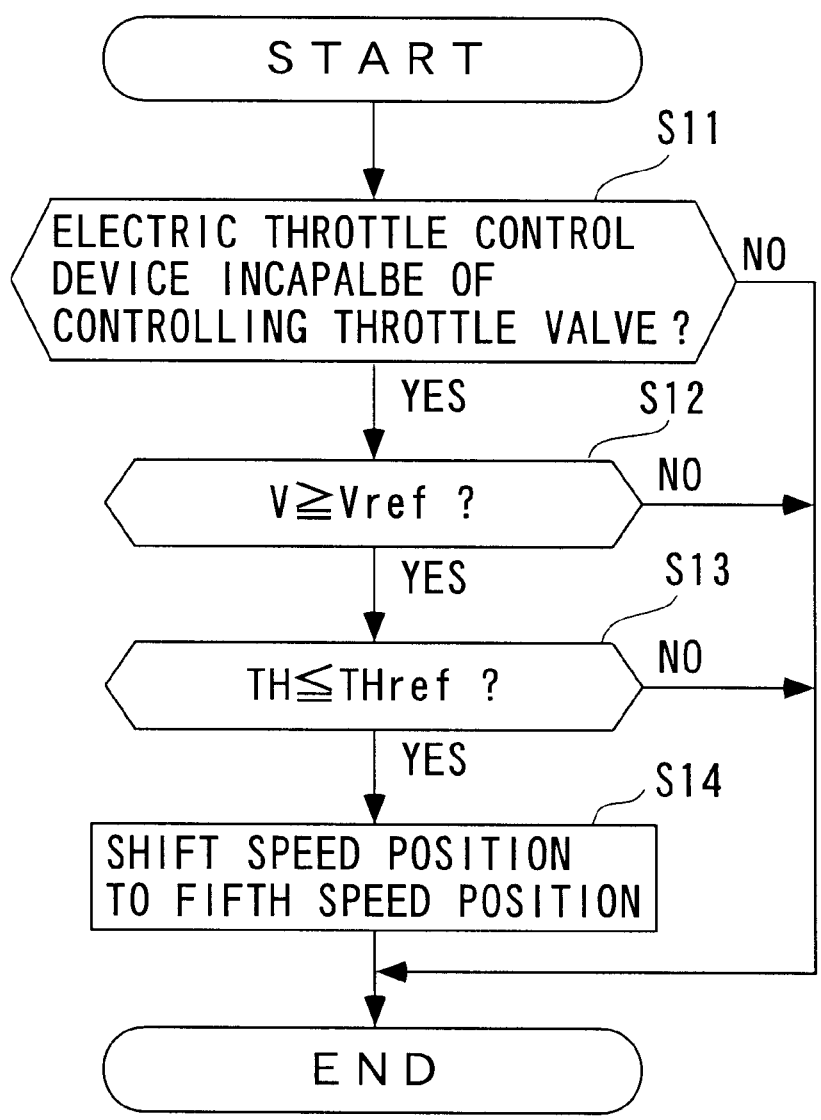
FIG. 4 is a flowchart of an automatic transmission control process for controlling the automatic transmission when the electric throttle control device is in the condition incapable of controlling the throttle valve.

FIG. 4 is a flowchart of an automatic transmission control process for controlling the automatic transmission 12 when the electric throttle control device is in the condition incapable of controlling the throttle valve 2. This process is repeatedly executed by the ECU 13 at predetermined time intervals.

First, in a step S11, similarly to the step S1 in FIG. 3, it is determined whether or not the electric throttle control device is in the condition incapable of controlling the throttle valve 2. If the electric throttle control device is capable of controlling the throttle valve 2, the program is immediately terminated. On the other hand, if the electric throttle control device is in the condition incapable of controlling the throttle valve 2, the program proceeds to a step S12, wherein it is determined whether or not the vehicle speed V is equal to or higher than a predetermined reference value Vref (e.g. 60 km/h). If the answer to the question is affirmative (YES), i.e. if V≧Vref holds, which means that the vehicle speed V is relatively high, the program further proceeds to a step S13, wherein it is determined whether or not the throttle valve opening TH is equal to or smaller than a predetermined reference value THref (e.g. 10 degrees). If the answer to the question is affirmative (YES), i.e. if TH≦THref holds, which means that the throttle valve 2 is actually held at the default position, a step S14 is executed to shift the speed position of the automatic transmission system 12 to a fifth speed position which is the highest of the five speed positions, followed by terminating the program. On the other hand, if the answer to the question of the step S12 or S13 is negative (NO), i.e. if V<Vref or TH>THref holds, the program is immediately terminated.

As described above, according to the vehicle control system of the present embodiment, when it is determined that the electric throttle control device is in the condition incapable of controlling the throttle valve 2, energization of the DC motor 1 is stopped by the ECU 13, and the throttle valve 2 is held at the default position by the spring 4. Further, when the throttle valve opening TH is equal to or smaller than the predetermined reference value THref, the speed position of the automatic transmission system 12 is shifted to the highest or fifth speed position. Thus, it is possible to positively prevent the speed position from being down-shifted when the accelerator pedal is stepped on during actual refuge running, to thereby prevent engine brake from causing a sudden decrease in the vehicle speed.

Further, when the electric throttle control device is determined to be in the condition incapable of controlling the throttle valve, and the vehicle speed V is equal to or higher than the predetermined reference value Vref, i.e. the vehicle speed V is relatively high at the time, the speed position of the automatic transmission system 12 is shifted to the fifth speed position, so that it is possible to avoid a sudden decrease in the vehicle speed during high-speed traveling which is easily affected by engine brake, thereby achieving smooth refuge running.

It should be noted that if the automatic transmission system 12 is controlled to release the torque converter 12b from its engaged state when the electric throttle control device is determined to be in the condition incapable of controlling the throttle valve, it is possible to further reduce the effect of engine brake, thereby achieving smoother refuge running.

It is further understood by those skilled in the art that the foregoing is a preferred embodiment of the invention, and that various changes and modifications may be made without departing from the spirit and scope thereof.

What is claimed is:

1. A control system for a vehicle including an electric throttle control device for electrically controlling a throttle valve that controls an amount of intake air to be supplied to an internal combustion engine, and an automatic transmission, the control system comprising:
uncontrollability-determining means for determining whether or not the electric throttle control device is in a condition incapable of controlling the throttle valve;
energization-interrupting means for interrupting energization of the electric throttle control device when it is determined by said uncontrollability-determining means that the electric throttle control device is in the condition incapable of controlling the throttle valve;
opening-holding means for holding the throttle valve at a default opening position when the electric throttle control device is determined to be in the condition incapable of controlling the throttle valve;
throttle opening-detecting means for detecting a degree of opening of the throttle valve; and
automatic transmission control means for controlling a speed position of the automatic transmission to a highest speed position if the detected degree of opening of the throttle valve is equal to or smaller than a predetermined reference value when the electric throttle control device is determined to be in the condition incapable of controlling the throttle valve.

2. A control system according to claim 1, further comprising vehicle speed-detecting means for detecting a traveling speed of the vehicle, and
wherein said automatic transmission control means controls the speed position of the automatic transmission to the highest speed position if the detected vehicle speed is equal to or higher than a predetermined reference value when the electric throttle control device is determined to be in the condition incapable of controlling the throttle valve.

3. A control system for a vehicle including an electric throttle control device for electrically controlling a throttle valve that controls an amount of intake air to be supplied to an internal combustion engine, and an automatic transmission, the control system comprising:
an uncontrollability-determining module for determining whether or not the electric throttle control device is in a condition incapable of controlling the throttle valve;
an energization-interrupting module for interrupting energization of the electric throttle control device when it is determined by said uncontrollability-determining module that the electric throttle control device is in the condition incapable of controlling the throttle valve;
an opening-holding module for holding the throttle valve at a default opening position when the electric throttle control device is determined to be in the condition incapable of controlling the throttle valve;
a throttle opening-detecting module for detecting a degree of opening of the throttle valve; and
an automatic transmission control module for controlling a speed position of the automatic transmission to a highest speed position if the detected degree of opening of the throttle valve is equal to or smaller than a predetermined reference value when the electric throttle control device is determined to be in the condition incapable of controlling the throttle valve.

4. A control system according to claim 3, further comprising a vehicle speed-detecting module for detecting a traveling speed of the vehicle, and
wherein said automatic transmission control module controls the speed position of the automatic transmission to the highest speed position if the detected vehicle speed is equal to or higher than a predetermined reference value when the electric throttle control device is determined to be in the condition incapable of controlling the throttle valve.

5. A control method of controlling a vehicle including an electric throttle control device for electrically controlling a throttle valve that controls an amount of intake air to be supplied to an internal combustion engine, and an automatic transmission, the control method comprising the steps of:
determining whether or not the electric throttle control device is in a condition incapable of controlling the throttle valve;
interrupting energization of the electric throttle control device when it is determined that the electric throttle control device is in the condition incapable of controlling the throttle valve;
holding the throttle valve at a default opening position when the electric throttle control device is determined to be in the condition incapable of controlling the throttle valve;
detecting a degree of opening of the throttle valve; and
controlling a speed position of the automatic transmission to a highest speed position if the detected degree of opening of the throttle valve is equal to or smaller than a predetermined reference value when the electric throttle control device is determined to be in the condition incapable of controlling the throttle valve.

6. A control method according to claim 5, further comprising the step of detecting a traveling speed of the vehicle, and
wherein the step of controlling the speed position of the automatic transmission includes controlling the speed position of the automatic transmission to the highest speed position if the detected vehicle speed is equal to or higher than a predetermined reference value when the electric throttle control device is determined to be in the condition incapable of controlling the throttle valve.

7. An engine control unit including a control program for causing a computer to control a vehicle including an electric throttle control device for electrically controlling a throttle valve that controls an amount of intake air to be supplied to an internal combustion engine, and an automatic transmission, wherein the control program causes the computer to determine whether or not the electric throttle control device is in a condition incapable of controlling the throttle valve, interrupt energization of the electric throttle control device when it is determined that the electric throttle control device is in the condition incapable of controlling the throttle valve, hold the throttle valve at a default opening position when the electric throttle control device is determined to be in the condition incapable of controlling the throttle valve, detect a degree of opening of the throttle valve, and control a speed position of the automatic transmission to a highest speed position if the detected degree of opening of the throttle valve is equal to or smaller than a predetermined reference value when the electric throttle control device is determined to be in the condition incapable of controlling the throttle valve.

8. An engine control unit to claim 7, wherein the program causes the computer to detect a traveling speed of the vehicle, and wherein the program causes the computer to control the speed position of the automatic transmission to the highest speed position when the electric throttle control device is determined to be in the condition incapable of controlling the throttle valve, further on condition that the detected vehicle speed is equal to or higher than a predetermined reference value.

\* \* \* \* \*